(No Model.) 2 Sheets—Sheet 1.
E. CHILDREN.
WHEEL CULTIVATOR.

No. 528,413. Patented Oct. 30, 1894.

WITNESSES:

INVENTOR
Edwin Children
BY
L. S. Bacon
ATTORNEY.

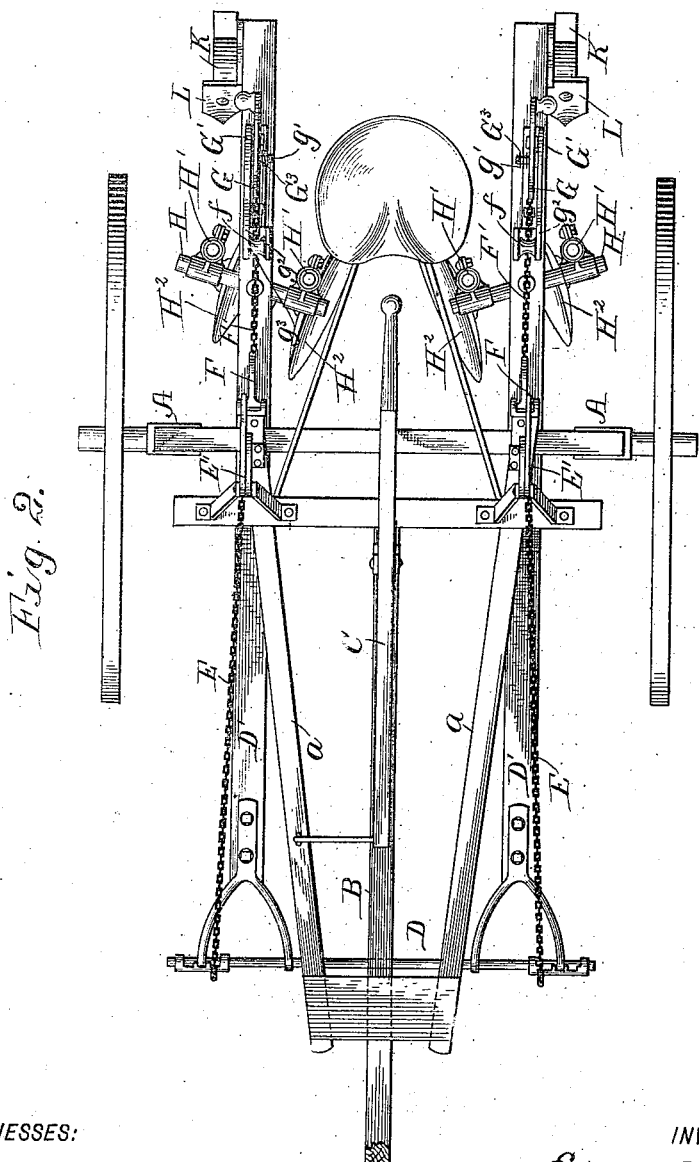

UNITED STATES PATENT OFFICE.

EDWIN CHILDREN, OF COUNCIL BLUFFS, IOWA.

WHEEL-CULTIVATOR.

SPECIFICATION forming part of Letters Patent No. 528,413, dated October 30, 1894.

Application filed December 9, 1893. Serial No. 493,225. (No model.)

*To all whom it may concern:*

Be it known that I, EDWIN CHILDREN, a citizen of the United States, residing at Council Bluffs, in the county of Pottawattamie and State of Iowa, have invented certain new and useful Improvements in Wheel-Cultivators; and I do hereby declare the following to be a full, clear, and exact description of the invention, such as will enable others skilled in the art to which it appertains to make and use the same.

This invention relates to an improvement in wheel cultivators and it consists in the construction and arrangement of parts hereinafter described and definitely pointed out in the claims.

The invention relates more particularly to that class of machines known as "straddle row cultivators."

The aim and purpose of my invention is to provide a cultivator of the nature above indicated, and to so construct the same that the merits of the shallow scraping action of the disks may be employed with the more thorough working of the shovels or shares, and to so arrange the same that the shovels will act directly on the disks with a tendency to hold them to their work and increase their penetration into the soil, and also to thoroughly work up or cultivate the soil at a point centrally between the rows and path of the outer disks so that the soil between the rows will be thoroughly loosened and left in a condition conducive to a thorough absorption of rain or moisture, and prevented from crusting or baking. These objects are attained by the construction illustrated in the accompanying drawings wherein like letters of reference indicate corresponding parts in the several views, and in which—

Figure 1:
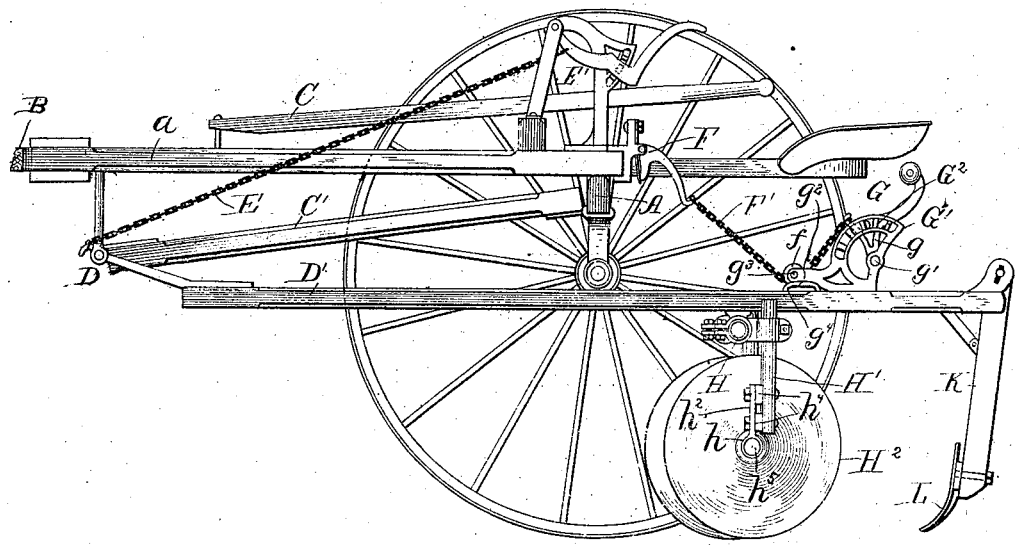
Figure 3:
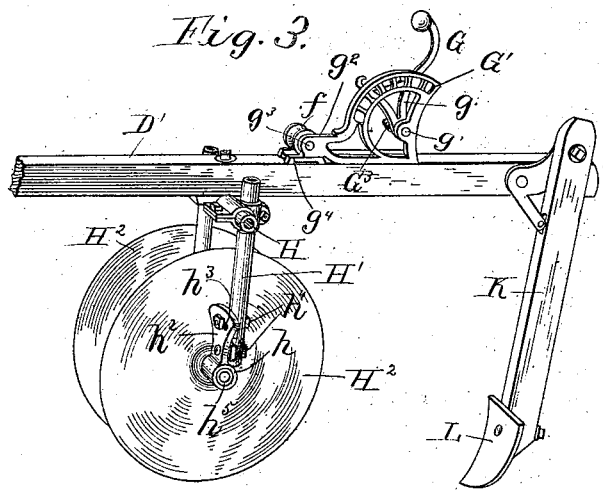

Figure 1 is a side elevation showing the near wheel removed. Fig. 2 is a plan view, and Fig. 3 is a detail view of a beam and its attachments.

In the drawings A represents the axle mounted on suitable wheels. To this axle is attached the frame work consisting of two oblique bars $a\,a'$ connected at their outer ends and between which the pole B is loosely held and pivoted. C is the hand lever pivotally supported on the pole and connected at its forward end to one of the oblique bars.

$C'$ indicate the reach bars pivotally and yieldingly secured to the axle and connected at their outer ends to the cross yoke D. To the outer ends of the latter the plow beams $D'$ are pivotally and adjustably secured, and extend back below and in the rear of the axle.

E represents the elevating chains connected to the outer ends of the yoke D, and at their opposite ends to the levers $E'$, fulcrumed in suitable uprights on a cross-bar of the frame.

On the rear ends of the oblique bars are the yieldingly supported hooks F to which the chains $F'$ are secured, which latter pass under the pulleys $f$ on the beams $D'$, their rear ends being attached to the levers G, pivotally mounted on the beams in the rear of the pulleys.

The construction above described with the exception of levers G and pulleys, is the same as that shown in my patent, No. 434,765, and I have therefore omitted the detail description of the various parts, it being sufficient to state that the purpose of the hand lever C is to alter the angle of the pole, and the levers $E'$ to adjust the forward ends of the beams; which will be noted are flexibly mounted to have a horizontal and vertical movement.

To adjust the rear ends of the beams the chains $F'$ are employed, the rear ends of which are secured to the levers G. These levers have an arm $g$ extending downward and through the lower ends of which pass the pins $g'$. The pins $g'$ are formed on a metallic frame $G'$ rigid on the beams. These frames $G'$ have a forwardly extending arm $g^2$ which extends slightly above the plane of the tops of the beams, and carry at their forward ends journals $g^3$ on which the pulleys $f$ are mounted, flanged wearing plates $g^4$ being secured on the beams below the pulleys. The upper portions of the frames $G'$ have segmental racks $G^2$ formed thereon with inclined teeth with which an inclined tooth on the levers G engages.

To hold the tooth on the lever in engagement with the teeth of the rack, and to permit of a ratchet and pawl action, coiled springs G³ are sleeved on the outer ends of the pins g', their inner ends abutting against suitable heads on the pins.

To move the teeth out of engagement, when the plows are to be lowered, it is only necessary to press laterally on the levers, the openings through which the pins pass being sufficiently large to permit such movement without binding. The springs immediately force the teeth into engagement when the lateral pressure is removed. The inclination of the teeth permit the lever to be moved back to raise the beams.

On the under side of the beams midway their length are secured the disk-supporting shafts H extending on opposite sides of the beams the same being preferably adjustably applied thereto. On the opposite ends of these shafts H are secured the vertical standards H' extending downward and on their lower ends carrying journal boxes $h$. These boxes are arranged obliquely to the plane of the beams, and have upwardly extending connecting plates $h^2$ formed with circular bolt openings in their lower ends and curved elongated openings $h^3$ in their upper ends, suitable bolts being passed through the openings and lower ends of the standards, there being spacing blocks $h^4$ interposed. By this means the pitch of the disks may be altered by simply loosening the nuts on the bolts passing through the elongated slots. H² indicate the concavo-convex disks (two in number on each side) usually having the stub axles $h^5$ on their convexed centers which are journaled in the boxes $h'$ the disks being at the inner ends of the boxes. These disks are used for the shallow cultivation of the soil at a point adjacent to the roots of the plants and do not act on the soil centrally between the rows.

To thoroughly cultivate and act on the soil intermediate the rows or between the space acted on by the disks, and where the roots of the plants will not be materially interfered with, and to hold the disks to their work, I arrange on the outer sides of the beams at their rear extremities the plow standards K. These standards are secured to the beam in any suitable manner. On the lower ends of the standards K are the shovels or shares L which have their lower points inclining forward and downward, thereby having a penetrating tendency when moving, which tends to hold the disks to their work. By this arrangement it will be seen that the shovels or shares travel in a path slightly beyond but in operative proximity to the path of the outer disks, and they are carried down to points below the plane of the lowest points of the disks, thereby thoroughly and deeply cultivating the soil at that point. By the operative proximity of the shovels to the path of the disks the former breaks up and covers the smooth surfaces left by the scraping action of the outer disks.

By the above described construction it will be seen that the essential feature of the invention is the improved manner of combining the disks with the shovels or shares so that the beneficial result of both may be obtained, resulting in a thorough cultivation of the soil.

In arranging the beams adjustable at their forward and rear ends, as described herein and shown in my patent above referred to, I am enabled to readily change the relative planes of the disks and shovels, the latter being on the extreme rear ends of the beams and the former on the same beam but intermediate the ends, so that as the beam is adjusted up or down the shares will have an increased or decreased penetration and thereby vary their holding down tendency on the disks, and further the disks may be practically elevated to penetrate the crust only, while the shares are permitted to deeply cultivate the intermediate soil. It will also be seen that this essential feature is applicable to other forms of cultivators.

I am aware that many minor changes in the construction and arrangement of the parts can be made and substituted for those herein shown and described without in the least departing from the nature and principle of my invention.

Having thus described my invention, what I claim as new, and desire to secure by Letters Patent, is—

1. In a straddle row cultivator, the combination with a cultivator beam, of a plurality of cultivating disks arranged at an incline and secured to the beam intermediate its ends, one of the disks being in advance of the other, and a cultivating share arranged in the rear of the disks, laterally and outwardly beyond the path of the outer disk, but in operative proximity to the path thereof, substantially as described.

2. In a straddle row cultivator, the combination with a beam, of a cultivating disk arranged at an incline and secured to the beam intermediate its ends, and a cultivating share on the beam in the rear of and laterally and outwardly beyond the plane of the disk, but in operative proximity to the path thereof, substantially as described.

3. In a straddle row cultivator, the combination with a beam, of a cultivating disk arranged at an incline and secured to the beam intermediate its ends, a cultivating share on the beam in the rear of and laterally and outwardly beyond the plane of the disk, but in operative proximity to the path thereof, and independent means for raising the opposite ends of the beam, substantially as described.

4. In a straddle row cultivator, the combination with the cultivator frame, of an adjustable beam, a hook on the frame, a metallic frame on the beam having a segmental rack on its side, a lateral pin below the rack, a lever having a lateral tooth engaging the rack and pivotally secured on the pin, a spring on the pin engaging the lever, a pulley mounted on the metallic frame, and a chain connected to the lever, passing below the pulley and connected at its opposite end to the hook, substantially as described.

In testimony whereof I affix my signature in presence of two witnesses.

EDWIN CHILDREN.

Witnesses:
G. F. SPOONER,
T. A. BUCKMAN.